United States Patent
Jansen

(10) Patent No.: US 8,421,255 B2
(45) Date of Patent: Apr. 16, 2013

(54) SYSTEM AND METHOD FOR DETERMINING THE TEMPERATURE OF A PERMANENT MAGNET IN A MACHINE

(75) Inventor: Patrick Lee Jansen, Scotia, NY (US)

(73) Assignee: General Electric Company, Schenectady, NY (US)

( * ) Notice: Subject to any disclaimer, the term of this patent is extended or adjusted under 35 U.S.C. 154(b) by 788 days.

(21) Appl. No.: 12/607,402

(22) Filed: Oct. 28, 2009

(65) Prior Publication Data

US 2010/0276929 A1   Nov. 4, 2010

(51) Int. Cl.
*H02P 9/04*   (2006.01)

(52) U.S. Cl.
USPC ............................ 290/44; 290/55; 700/287

(58) Field of Classification Search ............ 290/44, 290/55, 40 A–40 C, 40 F; 700/287, 290, 700/299
See application file for complete search history.

(56) References Cited

U.S. PATENT DOCUMENTS

| 2003/127862 | A1 | 7/2003 | Weitkamp | |
|---|---|---|---|---|
| 2006/0238172 | A1* | 10/2006 | Maehara et al. | 322/33 |
| 2011/0140424 | A1* | 6/2011 | Edenfeld | 290/44 |
| 2011/0144814 | A1* | 6/2011 | Menke | 700/287 |

FOREIGN PATENT DOCUMENTS

| WO | WO 2004012327 A1 * | 2/2004 |
|---|---|---|
| WO | WO 2009/003478 | 1/2009 |

\* cited by examiner

*Primary Examiner* — Tulsidas C Patel
*Assistant Examiner* — Viet Nguyen
(74) *Attorney, Agent, or Firm* — Dority & Manning, P.A.

(57) ABSTRACT

A system for determining a temperature of a permanent magnet in a machine includes a voltage sensor that generates a voltage signal reflective of a stator voltage and a current sensor that generates a current signal reflective of a stator current. A processor receives the voltage and current signals and generates a temperature signal reflective of the temperature of the permanent magnet in the machine. A method for controlling a load of a machine includes generating a voltage signal, a current signal, and a temperature signal reflective of the temperature of a permanent magnet in the machine. The method further includes adjusting the load of the machine based on the temperature signal.

9 Claims, 3 Drawing Sheets

US 8,421,255 B2

SYSTEM AND METHOD FOR DETERMINING THE TEMPERATURE OF A PERMANENT MAGNET IN A MACHINE

FIELD OF THE INVENTION

The present invention pertains to a permanent magnet in a machine. Specifically, embodiments of the present invention involve a system and method for determining the temperature of a permanent magnet in a generator or motor.

BACKGROUND OF THE INVENTION

Machines such as motors and generators typically include a rotor and a stator. The rotor may include a permanent magnet that produces a magnetic field. In a generator, rotation of the rotor with respect to the stator causes the magnetic field from the permanent magnet to rotate, thereby inducing electric current flow through windings in the stator. Conversely, in a motor, current flow through the stator windings induces rotation of the permanent magnet, and thus the rotor.

Operation of the machine creates losses and then subsequent heating in the permanent magnet. For a given operating point and design, the permanent magnet has an effective maximum allowable operating temperature, which, if exceeded by even a few degrees for a short period of time, may result in sudden and irreversible demagnetization of the permanent magnet which prevents the machine from operating at its designed potential. This risk can be particularly acute during the event of a sudden short circuit fault of the generator or seen by the generator, for example, a short circuit in the windings, terminals, or cabling, or more commonly, of the generator control electronics such as a rectifier or power electronic converter. As a result, to mitigate this risk, machines are often designed with larger and higher-grade (e.g., higher allowable temperature) permanent magnets and/or operated at reduced loads to reduce the risk of demagnetization of the permanent magnet. In addition, machines often include control systems that monitor the temperature of the permanent magnet to prevent excessive temperatures.

Directly monitoring the permanent magnet temperature is not feasible because of the rotation of the rotor. Therefore, control systems are typically limited to, at best, indirectly monitoring the permanent magnet temperature by monitoring the temperature of the stator windings. For example, resistance temperature detectors (RTDs), whose resistance varies proportional to the temperature, may be physically installed within the stator. Wiring from the RTDs transmits a temperature signal from the RTDs to the control system, and the control system may use the temperature signal to adjust the load of the machine to reduce the temperature of the stator, and thus hopefully also the temperature of the permanent magnet. This arrangement, however, is also susceptible to failure of the RTDs or wiring. As a result, multiple RTDs and associated wiring are typically installed within the stator to provide redundancy. Furthermore, with only stator winding temperature detection, there is no direct knowledge of the magnet temperature or guarantee that the magnet temperature is within safe or desired bounds. Therefore, controlling the load on the machine based on the stator temperature may unnecessarily limit the rated load of the machine or put the magnets at unacceptable risk of irreversible demagnetization.

Therefore, the need exists for a system and method for determining the temperature of the permanent magnet in machines. Ideally, the system and method will reliably provide an accurate reflection of the permanent magnet temperature without requiring redundant sensors and without unnecessarily restricting the rated load of the machine.

BRIEF DESCRIPTION OF THE INVENTION

Aspects and advantages of the invention are set forth below in the following description, or may be obvious from the description, or may be learned through practice of the invention.

One embodiment of the present invention is a system for determining a temperature of a permanent magnet in a machine. The system includes a voltage sensor and a current sensor. The voltage sensor generates at least one voltage signal reflective of a voltage potential across a stator, and the current sensor generates at least one current signal reflective of a current flow through the stator. A processor receives the at least one voltage signal and the at least one current signal and generates a temperature signal reflective of the temperature of the permanent magnet in the machine.

Another embodiment of the present invention is a system for regulating a load on a machine. The system includes a voltage sensor and a current sensor. The voltage sensor generates at least one voltage signal reflective of a voltage potential across a stator, and the current sensor generates at least one current signal reflective of a current flow through the stator. A processor receives the at least one voltage signal and the at least one current signal and generates a temperature signal reflective of a temperature of a permanent magnet in the machine. A controller receives the temperature signal and adjusts the load of the machine based on the temperature signal.

The present invention also includes a method for controlling a load of a machine. The method includes generating at least one voltage signal reflective of a voltage potential across a stator and generating at least one current signal reflective of a current flow through the stator. The method further includes generating a temperature signal reflective of the temperature of a permanent magnet in the machine, wherein the temperature signal is based on the at least one voltage signal and the at least one current signal, and adjusting the load of the machine based on the temperature signal.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
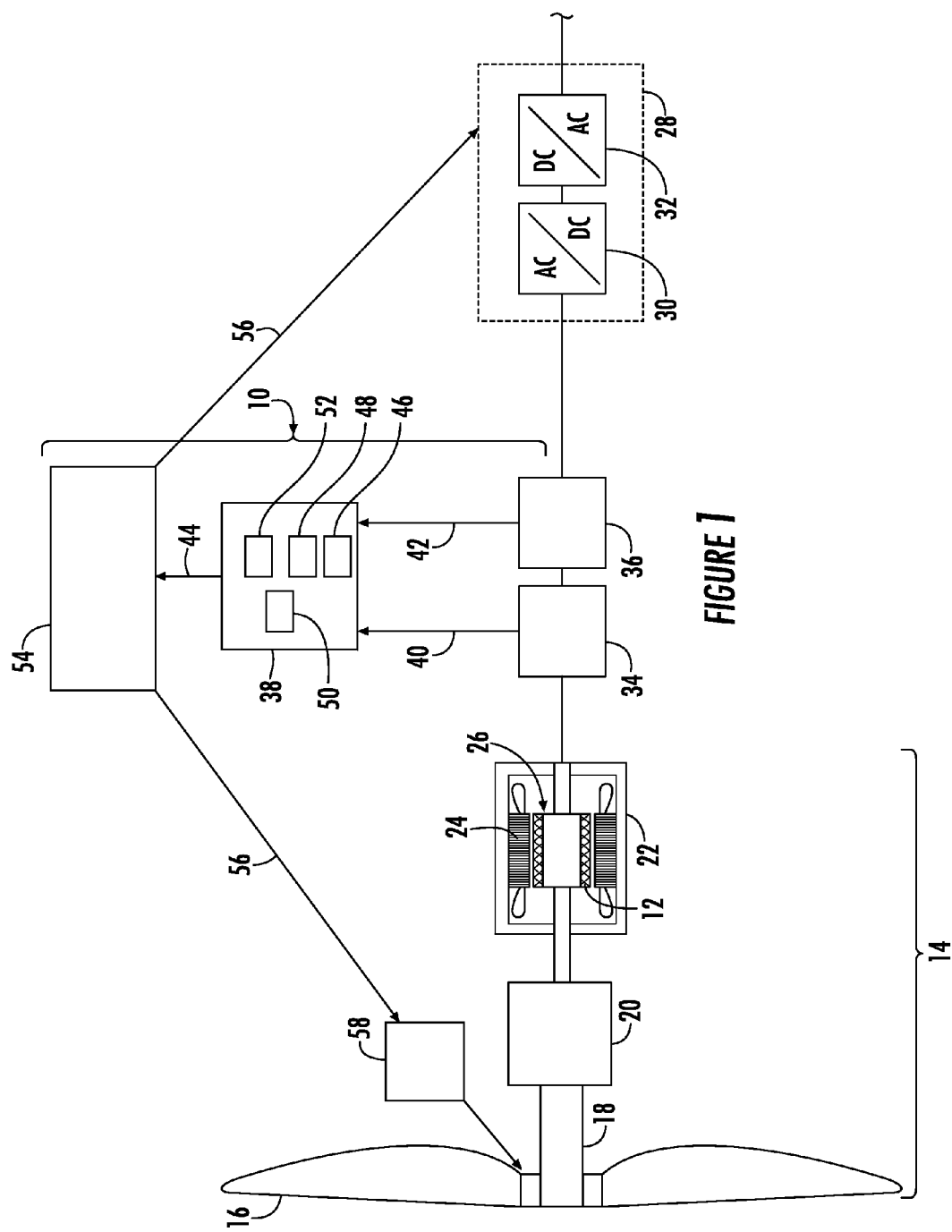
FIG. 1 is a block diagram of a system for determining a temperature of a permanent magnet according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a system and method for determining the temperature of a permanent magnet in a machine. The system and method may further use the temperature of the permanent magnet to adjust the load on the machine to prevent excessive temperatures in the permanent magnet. Alternately, the system or method may adjust the load on the machine to achieve a desired temperature of the permanent magnet. The machine may be a motor or a generator, depending on the particular embodiment. By way of illustration, embodiments of the present invention are provided in the context of a wind turbine generator. However, the present invention is equally applicable to other types of generators or motors having a rotor with a permanent magnet.

FIG. 1 shows a block diagram of a system 10 for determining a temperature of a permanent magnet 12 according to one embodiment of the present invention. In this embodiment, the system 10 is illustrated in the context of a wind turbine generator 14. The wind turbine generator 14 generally includes a rotor blade 16, a shaft 18, a gear box 20, and a generator 22. Wind rotates the rotor blade 16 to create mechanical energy, and the shaft 18 and the gear box 20 transfer the mechanical energy from the rotor blade 16 to the generator 22. The generator 22 includes a stator 24 and a rotor 26, with the permanent magnet 12 included in the rotor 26. Rotation of the rotor 26 converts the mechanical energy to electrical energy by inducing a voltage and current through the stator 24. Electrical energy from the stator 24 flows to a converter 28 where AC-to-DC and DC-to-AC bridges 30, 32 convert and regulate the voltage and frequency of the electrical energy to be compatible with a local power grid.

The system 10 includes a voltage sensor 34, a current sensor 36, and a processor 38. The voltage sensor 34 connects to the output of the stator 24 and generates a voltage signal 40 reflective of a voltage potential across the stator 24. The current sensor 36 similarly connects to the output of the stator 24 and generates a current signal 42 reflective of the current flowing through the stator 24. The voltage 34 and current 36 sensors may be existing components already present in the converter 28 to provide feedback signals. Alternately, the voltage 34 and current 36 sensors may be separate components dedicated for use by the processor 38, as shown in FIG. 1. For a multiple phase generator, the system 10 may include separate voltage 34 and current 36 sensors for each phase of electrical energy produced by the multiple-phase generator.

The processor 38 receives the voltage 40 and current 42 signals and generates a temperature signal 44 reflective of the temperature of the permanent magnet 12 in the rotor 26. The processor 38 may include various components such as memory/media elements and/or co-processors that store data, store software instructions, and/or perform subroutines called for by the processor. For example, a first memory/media element 46 may store data, and a second memory/media element 48 may store software and/or firmware in the form of computer readable and executable instructions. The processor 38 and/or co-processor 50, if present, may access the data stored in the first memory/media element 46 and act on the data according to the software instructions stored in the second memory/media element 48. The various memory/media elements may be singular components or multiple portions of one or more varieties of computer-readable media, such as, but not limited to, any combination of volatile memory (e.g., RAM, DRAM, SRAM, etc.) and/or non-volatile memory (e.g., ROM, flash drives, hard drives, magnetic tapes, CD-ROM, DVD-ROM, etc.) and/or any other memory devices (e.g., diskettes, drives, magnetic-based storage media, optical storage media, etc.). Although the processor 38 shown in FIG. 1 includes multiple separate memories/media elements, the content dedicated to such devices may actually be stored in one memory/media element or in multiple elements. Any possible variations of data storage will be appreciated by one of ordinary skill in the art.

In one particular embodiment of the present invention, the first memory/media 46 is configured to store a matrix of current values and voltage constants associated with the permanent magnet 12 and generator 22. For example, the remanent flux density of the permanent magnet 12, and hence the voltage constant of the generator 22, varies with the temperature of the permanent magnet 12 in a well-known manner. A voltage constant ($k_e$) is defined to be the internal voltage or back-emf of the generator divided by the generator speed, expressed as volts per rad/sec. The voltage constant can also be equivalently defined as the flux linkage of the stator windings created by the permanent magnet, expressed as webers. For a NdFeB permanent magnet, for example, the voltage constant of the generator will decrease by 0.10-0.11% per degree Centigrade increase in the mean temperature of the magnet. The matrix of current values and voltage constants may be preprogrammed into the first memory/media element 46 from specifications provided with the permanent magnet 12 or generator 22, or it may be obtained from testing performed on the permanent magnet 12 or generator 22 and entered as input data.

The second memory/media element 48 may include computer executable software instructions that may be read and executed by the processor 38, for example when receiving the voltage 40 and current 42 signals, accessing the data on the first memory/media element 46, or generating the temperature signal 44. Calculations and executions performed by the processor 38 may be stored in a third memory/media element 52, output to a peripheral device, such as a printer or a monitor, and/or transmitted to a controller 54, as shown in FIG. 1. In this manner, the processor 38 may be adapted to operate as a special purpose processor by executing the software instructions rendered in a computer readable form and stored in the second memory/media element 48. The software may be provided in any suitable programming, scripting, or other type of language or combinations of languages to implement the teachings contained herein. In other embodiments of the present invention, the processor 38 may be implemented by hardwired logic or other circuitry, including, but not limited to application-specific circuits.

As shown in FIG. 1, the processor 38 transmits the temperature signal 44 reflective of the permanent magnet temperature to the controller 54. The controller 54 may use the temperature signal 44 to adjust the load of the wind turbine generator 14 based on the temperature signal 44. For example, the controller 54 may send a signal 56 to the converter 28 to regulate the loading of the generator 22 consistent with available wind conditions and wind turbine blade 16 speed and pitch angles. Alternately or in addition, the controller 54 may send the signal 56 to an actuator 58 that adjusts the pitch of the rotator blades 16 to appropriately change the rotational speed of the rotor blades 16. In other embodiments, the controller 54 may adjust other parameters that effect the load on the generator 22. For example, the controller 54 may alter the effective gear ratio in the gear box 20, vary the effective field excitation (e.g., flux-axis current in a permanent magnet generator) provided to the rotor 26, or adjust any other parameter that changes the mechanical energy provided to or electrical energy extracted from the generator 22. Alternatively, the controller 54 may use the temperature signal 44 to adjust the amount of cooling supplied to the generator 22 to achieve any number of goals, including improving overall system efficiency, maximizing generator life, and/or reducing the susceptibility of the permanent magnets to irreversible demagnetization. The processor 38, co-processor 50 (if present), and memory/media elements 46, 48, 52 may be existing components already present in the converter 28, or alternately, they may be separate components dedicated for use by the controller 54, as shown in FIG. 1.

Figure 2:
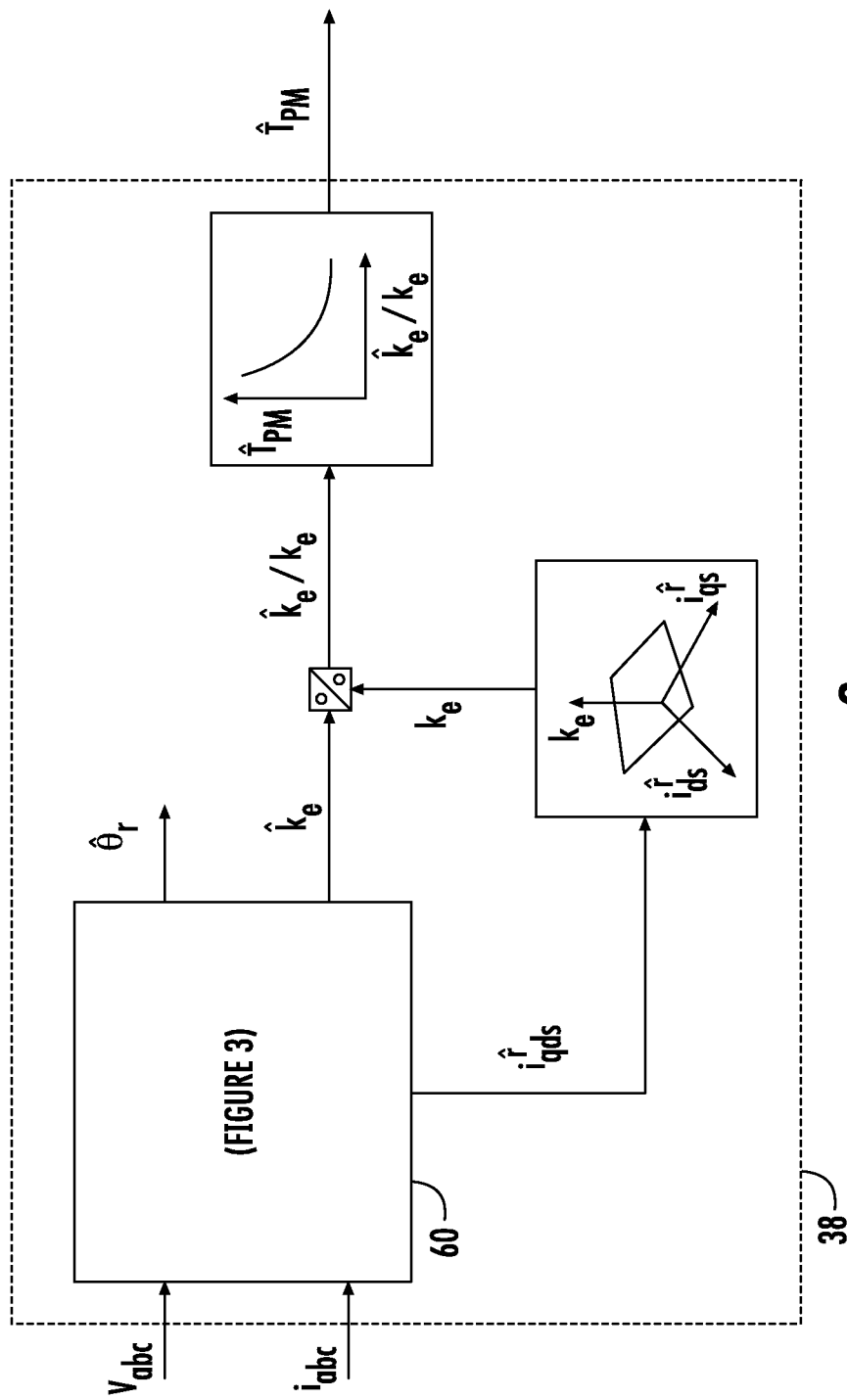
FIG. 2 is a simplified block diagram of the functions performed by the processor shown in FIG. 1.

FIG. 2 provides a simplified block diagram illustrating the functions performed by the processor 38 shown in FIG. 1. As shown, the processor 38 receives the voltage and current signals, $v_{abc}$ and $i_{abc}$ respectively, from the voltage 34 and current 36 sensors and generates an effective voltage constant signal $\hat{k}_e$ and an actual current signal $i^r_{qds}$. The effective voltage constant signal $\hat{k}_e$ is reflective of the actual temperature of the permanent magnet 12 in the generator 22. The actual current signal $i^r_{qds}$ is reflective of current flow through the stator 24 and referenced to the estimated rotor position reference frame. The processor 38 compares the actual current signal $i^r_{qds}$ to the matrix data stored in the first memory/media 46 to retrieve a reference voltage constant signal $k_e$ for the permanent magnet 12. For some permanent magnet generator electromagnetic designs, the reference voltage constant signal $k_e$ is effectively independent of the stator current level in the generator and thus may be implemented as simply a single constant value independent of the actual current signal $i^r_{qds}$. For other permanent magnet generator electromagnetic designs, the voltage constant signal may be highly dependent upon the stator current level, and thus a mapping with the matrix data in the first memory/media element 46 is desirable, as shown in FIG. 2. The matrix data can be obtained from the design analysis of the permanent magnet generator at a specified magnet temperature, if available, or experimentally using appropriate well-known means for measuring rotor and/or magnet temperatures in an instrumented test generator.

The processor 38 then generates the magnet temperature signal $\hat{T}_{PM}$ reflective of the temperature of the permanent magnet 12 in the rotor 26 based on the ratio of the effective voltage constant signal $\hat{k}_e$ and the reference voltage constant signal $k_e$ at a known reference magnet temperature, $T_{PM\_ref}$. In the preferred embodiment, the relationship between the ratio of the effective and reference voltage constants and the magnet temperature signal is simply:

$$\hat{T}_{PM} = T_{PM\_ref} + \frac{\left(\frac{\hat{k}_e}{k_e} - 1\right) * 100\%}{k_{BrT}}$$

where $k_{BrT}$ is the known thermal coefficient of the remanent flux density of the magnet material (obtained via the magnet manufacturer data or via testing), which is typically in the range of −0.10% to −0.13% per degree C. change for NdFeB rare-earth magnets.

Figure 3:
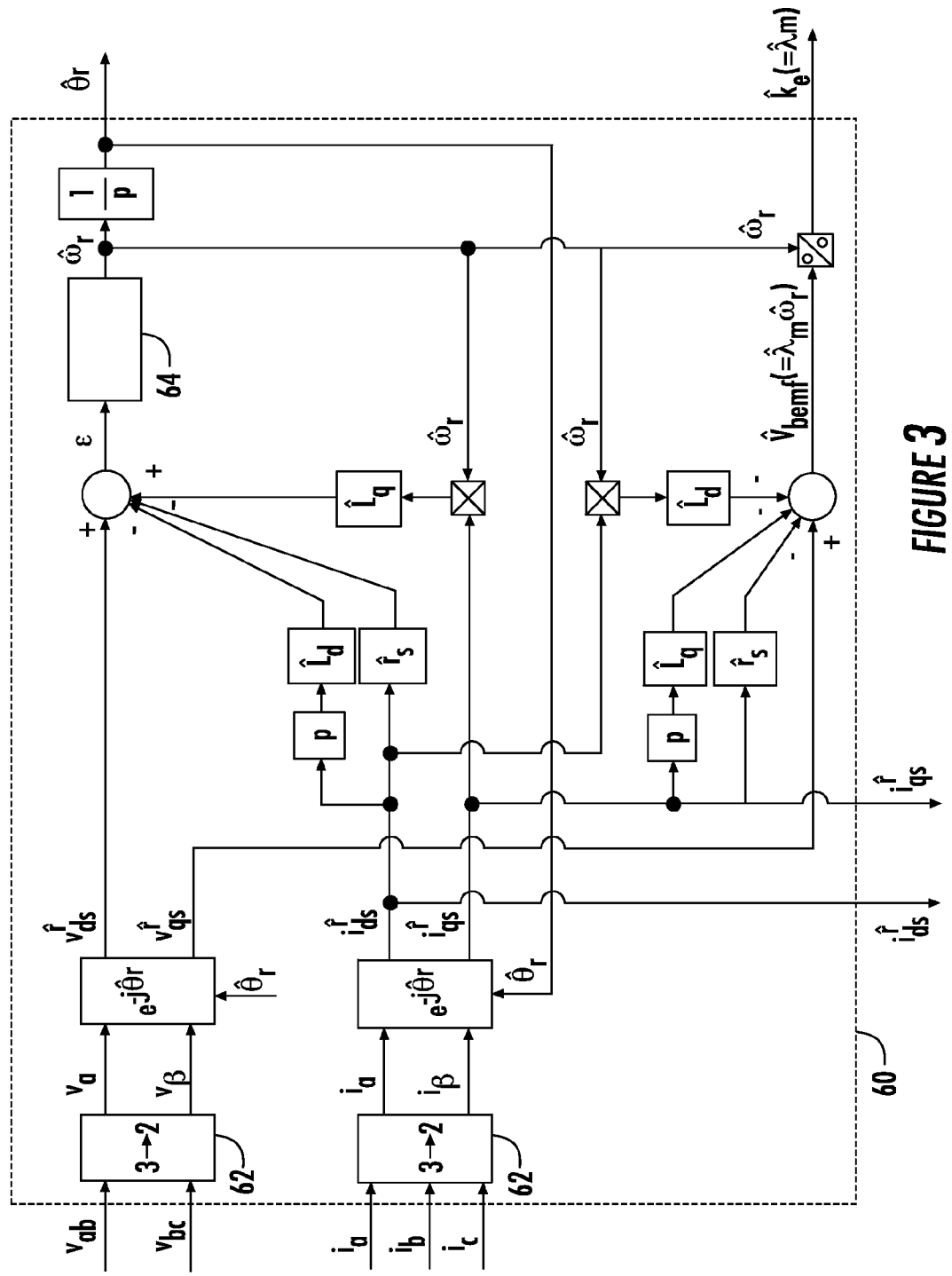
FIG. 3 is a block diagram of an algorithm according to one embodiment of the present invention.

FIG. 3 provides a block diagram of one algorithm 60 for calculating the effective voltage constant signal $\hat{k}_e$ and actual current signal $i^r_{qds}$ previously described with respect to FIG. 2. This particular algorithm 60 is applicable to a three-phase generator 22. For convention, the following symbols will be used in explaining the operation of the algorithm 60 shown in FIG. 3:

$v_{ab}$=the instantaneous stator voltage between phases a and b in a stationary three-phase reference frame, in volts;

$v_{bc}$=the instantaneous stator voltage between phases b and c in a stationary three-phase reference frame, in volts;

$v_\alpha$=the alpha-axis measured instantaneous stator terminal voltage in a stationary two-axis reference frame, in volts;

$v_\beta$=the beta-axis measured instantaneous stator terminal voltage in a stationary two-axis reference frame, in volts;

$v^r_{ds}$ =the d-axis measured instantaneous stator terminal voltage in the estimated rotor position reference frame, in volts; $v^r_{qs}$ =the q-axis measured instantaneous stator terminal voltage in the estimated rotor position reference frame, in volts;

$i_a$=the phase a instantaneous stator current in a stationary three-phase reference frame, in amperes;

$i_b$=the phase b instantaneous stator current in a stationary three-phase reference frame, in amperes;

$i_c$=the phase c instantaneous stator current in a stationary three-phase reference frame, in amperes;

$i_\alpha$=the alpha-axis measured instantaneous stator current in a stationary two-axis reference frame, in amperes;

$i_\beta$=the beta-axis measured instantaneous stator current in a stationary two-axis reference frame, in amperes;

$i^r_{ds}$ =the d-axis measured instantaneous stator current in the estimated rotor position reference frame, in amperes;

$i^r_{qs}$ =the q-axis measured instantaneous stator current in the estimated rotor position reference frame, in amperes;

$i^r_{qds}$ =the combined q-axis and d-axis measured instantaneous stator current vector in the estimated rotor position reference frame, in amperes; i.e., [$i^r_{qs}$, $i^r_{ds}$];

$\hat{r}_s$=the estimated stator resistance per phase, in ohms;

$\hat{L}_d$=the estimated synchronous inductance of the stator winding along the d-axis (i.e., aligned with the permanent magnet field in the rotor), in Henries;

$\hat{L}_q$=the estimated synchronous inductance of the stator winding along the q-axis (i.e., in quadrature with the permanent magnet field in the rotor), in Henries;

$\hat{\omega}_r$=the estimated angular velocity of the rotor, in radians per second;

$\hat{\theta}_r$=the estimated angular position of the rotor, in radians;

$\hat{k}_{bemf}$=the estimated machine back-emf (voltage) constant, in volts per radians per second;

$\hat{\lambda}_m$=the estimated magnet flux linkage, in weber-turns;

p=the derivative operator; e.g., $pi^r_{ds}$ =the derivative of $i^r_{ds}$;

$\frac{1}{p}$ = the integral operator; e.g., $\frac{1}{p}\hat{\omega}_r$ = the integral of $\hat{\omega}_r$, or $\hat{\theta}_r$.

The derivative p and integral $\frac{1}{p}$ functions may be implemented by the processor or co-processor using standard digital control methods, with filtering as needed to reduce noise, as is well-known in the art.

Referring now to the algorithm 60 shown in FIG. 3, the processor 38 may receive a plurality of voltage signals $v_{ab}$, $v_{bc}$, and current signals $i_a$, $i_b$, $i_c$ reflective of the stator voltage and current. The voltage $v_{ab}$, $v_{bc}$ and current $i_a$, $i_b$, $i_c$ signals are the measured instantaneous (e.g., periodically digitally sampled) three-phase generator terminal (line-to-line) voltages and currents. Sample rates are preferably at least 1.0 kHz for machines with rated or base fundamental frequencies in the range of 50 to 100 Hz. The three-phase voltage $v_{ab}$, $v_{bc}$, and current $i_a$, $i_b$, $i_c$ signals are transformed to stationary two-phase voltages $v_\alpha$, $v_\beta$ and currents $i_\alpha$, $i_\beta$ using well-known transformation functions 62. One skilled in the art of electric motor or generator control will recognize that these quantities are the equivalent two-axis stationary-frame quantities commonly used in vector or field oriented control of electric machines, e.g., in vector controlled drives for electric motors. Many of the key features of the algorithm 60 are thus also consistent with and commonly used with well-known electric machine vector control theory and implementation.

The algorithm 60 converts the sampled alpha-beta quantities (i.e., $v_\alpha$, $v_\beta$ and $i_\alpha$, $i_\beta$) from the stationary (stator) frame to the estimated rotor frame based on an instantaneous estimated rotor position angle, $\hat{\theta}_r$. The conversion uses the complex rotation transformation $e^{-j\hat{\theta}_r}$ because the stator voltages and currents can be considered as complex phasors, i.e., $v = v_\alpha + j v_\beta$. In alternate embodiments, however, the conversion may be performed using individual real quantities with sine and cosine functions. The conversion further uses permanent magnet generator equivalent circuit parameters in the d-q rotor reference frame, i.e., inductances $\hat{L}_d$ and $\hat{L}_q$, stator resistance, $\hat{r}_s$. The conversion produces actual voltage $v_{ds}^{\hat{r}}$, $v_{qs}^{\hat{r}}$, and actual current $i_{ds}^{\hat{r}}$, $i_{qs}^{\hat{r}}$ signals in the estimated rotor (d-q) frame.

In the rotor frame, the actual voltage signals can be expressed as:

$$v_{ds}^{\hat{r}} = \hat{r}_s i_{ds}^{\hat{r}} + \hat{L}_{ds} p i_{ds}^{\hat{r}} + p\hat{\lambda}_m - \hat{\omega}_r \hat{L}_{qs} i_{qs}^{\hat{r}}$$

$$v_{qs}^{\hat{r}} = \hat{r}_s i_{qs}^{\hat{r}} + \hat{L}_{qs} p i_{qs}^{\hat{r}} + \hat{\omega}_r \hat{\lambda}_m + \hat{\omega}_r \hat{L}_{ds} i_{ds}^{\hat{r}}$$

In a permanent magnet machine, the magnet flux is effectively constant, except for the slow variations due to temperature changes. As a result, the derivative of magnet flux $p\hat{\lambda}_m$ is thus assumed to be zero in this algorithm 60.

The d-axis voltage equation is then rearranged to form the following error function:

$$\varepsilon = v_{ds}^{\hat{r}} - \hat{r}_s i_{ds}^{\hat{r}} - \hat{L}_{ds} p i_{ds}^{\hat{r}} + \hat{\omega}_r \hat{L}_{qs} i_{qs}^{\hat{r}}.$$

An error subroutine 64 drives the error function to zero. The error subroutine 64 may comprise a proportional plus integral gains (PI) controller or other equivalent controller well-known in the art. The output of the error subroutine 64 is an estimate of the instantaneous rotor angular velocity, $\hat{\omega}_r$, which is then integrated to form an estimate of the instantaneous rotor angular position, $\hat{\kappa}_r$. The value for $\hat{\kappa}_r$ is used to convert the sampled alpha-beta quantities (i.e., $v_\alpha$, $v_\beta$ and $i_\alpha$, $i_\beta$) from the stationary (stator) frame to the estimated rotor frame, as previously discussed. Thus the algorithm 60 uses the d-axis voltage equation to create an estimate of the instantaneous rotor angular position, $\hat{\kappa}_r$, thereby establishing the rotor reference frame transformation.

The algorithm 60 also uses the q-axis voltage $v_{qs}^{\hat{r}}$ to calculate an estimated permanent magnet flux linkage $\hat{\lambda}_m$. The q-axis voltage equation is rearranged to first calculate a generator back-emf voltage, $\hat{v}_{bemf}$ as follows:

$$\hat{v}_{bemf} = \hat{\omega}_r \hat{\lambda}_m = v_{qs}^{\hat{r}} - \hat{r}_s i_{qs}^{\hat{r}} - \hat{L}_{qs} p i_{qs}^{\hat{r}} - \hat{\omega}_r \hat{L}_{ds} i_{ds}^{\hat{r}}$$

The estimated magnet flux linkage is then calculated as:
$\hat{\lambda}_m = \hat{v}_{bemf}/\hat{\omega}_r$ This magnet flux linkage $\hat{\lambda}_m$ is equivalent to the effective voltage constant $\hat{k}_e$ of the generator, so that $\hat{k}_e = \hat{\lambda}_m$.

It should be apparent to one of ordinary skill in the art that the accuracy of the algorithm 60 and calculations performed by the processor 38 is dependent on the accuracy of the generator circuit parameter elements, especially the inductance values $\hat{L}_d$ and $\hat{L}_q$. To enhance the accuracy of the calculations, and thus the accuracy of the temperature signal 44 reflective of the temperature of the permanent magnet 12 in the rotor 26, the matrix of current values and voltage constants associated with the permanent magnet 12 stored in the first memory/media element 46 should be based on the same inductance values as used in the calculations and conversions performed by the processor 38. Furthermore, the inductance values are preferably measured functions of the generator 22 operating points; e.g., $\hat{L}_q = \hat{L}_q(i_{qs}^{\hat{r}}, i_{ds}^{\hat{r}})$, and $\hat{L}_d = \hat{L}_d(i_{qs}^{\hat{r}}, i_{ds}^{\hat{r}})$.

As previously discussed, embodiments of the present invention are equally applicable to both motors and generators. The continuous monitoring of the permanent magnet temperature allows the controller 54 to adjust the load on the motor or generator to prevent excessive temperatures in the permanent magnet. For example, the controller 54 may adjust the load on the machine to closely regulate the temperature of the machine and operate the machine at a predetermined temperature profile on a real-time basis. The predetermined temperature profile may be adjusted over the life of the machine based on various design goals, maintenance schedules, and/or operational needs. Continuous and accurate monitoring of the temperature of the permanent magnet also allows for reduced design safety margins. As a result, new and existing machines may be operated at higher temperatures and/or operating levels for intermittent or extended periods without damaging the permanent magnet. Moreover, the system and methods within the scope of the present invention obviate the need for redundant monitoring systems and allow for smaller and less expensive permanent magnets to achieve the same or better operating levels than previously experienced.

It should be appreciated by those skilled in the art that modifications and variations can be made to the embodiments of the invention set forth herein without departing from the scope and spirit of the invention as set forth in the appended claims and their equivalents.

What is claimed is:

1. A system for determining a temperature of a permanent magnet in a machine, comprising:
   a. a voltage sensor, wherein the voltage sensor generates at least one voltage signal reflective of a voltage potential across a stator;
   b. a current sensor, wherein the current sensor generates at least one current signal reflective of a current flow through the stator; and
   c. a processor that receives the at least one voltage signal and the at least one current signal, converts the at least one voltage signal and the at least one current signal to an effective voltage constant signal, converts the at least one current signal to an actual current signal referenced to a rotor in the machine, generates a reference voltage constant signal based on the actual current signal, wherein the reference voltage constant signal reflects a reference temperature of the permanent magnet in the rotor, and generates a temperature signal reflective of the temperature of the permanent magnet in the machine based on the ratio of the effective voltage constant signal and the reference voltage constant signal.

2. A system for regulating a load on a machine, comprising:
a. a voltage sensor, wherein the voltage sensor generates at least one voltage signal reflective of a voltage potential across a stator;
b. a current sensor, wherein the current sensor generates at least one current signal reflective of a current flow through the stator;
c. a processor that receives the at least one voltage signal and the at least one current signal, converts the at least one voltage signal and the at least one current signal to an effective voltage constant signal, converts the at least one current signal to an actual current signal referenced to a rotor in the machine, generates a reference voltage constant signal based on the actual current signal, wherein the reference voltage constant signal reflects a reference temperature of the permanent magnet in the rotor, and generates a temperature signal reflective of the temperature of the permanent magnet in the machine based on the ratio of the effective voltage constant signal and the reference voltage constant signal; and
d. a controller that receives the temperature signal and adjusts the load of the machine based on the temperature signal.

3. The system of claim 2, wherein the machine is a generator.

4. The system of claim 2, wherein the machine is a wind turbine generator.

5. The system of claim 4, wherein the controller adjusts a pitch of a rotor blade on the wind turbine generator.

6. A method for controlling a load of a machine, comprising:
a. generating at least one voltage signal reflective of a voltage potential across a stator;
b. generating at least one current signal reflective of a current flow through the stator;
c. converting the at least one voltage signal and the at least one current signal to an effective voltage constant signal of the machine;
d. converting the at least one current signal to an actual current signal, wherein the actual current signal is referenced to a rotor in the machine;
e. generating a reference voltage constant signal based on the actual current signal, wherein the reference voltage constant signal reflects a reference temperature of the permanent magnet in the rotor;
f. generating a temperature signal reflective of the temperature of a permanent magnet in the machine based on the ratio of the effective voltage constant signal and the reference voltage constant signal; and
g. adjusting the load of the machine based on the temperature signal.

7. The method of claim 6, further including adjusting the load of the machine to achieve a desired temperature of the permanent magnet in the machine.

8. The method of claim 7, further including adjusting the desired temperature of the permanent magnet in the machine.

9. The method of claim 6, further including increasing the load of the machine to increase the temperature of the permanent magnet in the machine.

* * * * *